April 13, 1948. S. M. McEWEN 2,439,743
SUBSOILER AND AERATOR
Filed Oct. 30, 1945
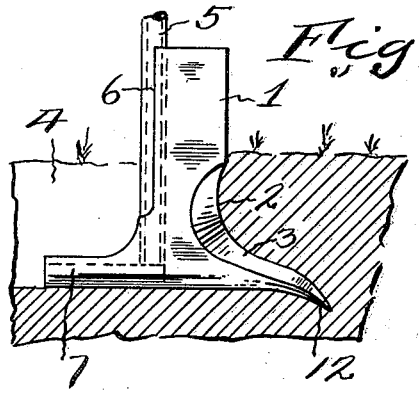
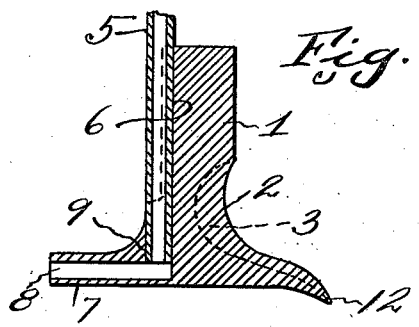
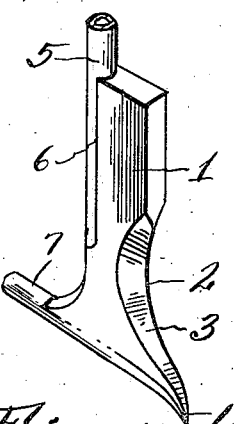
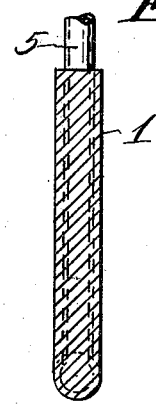
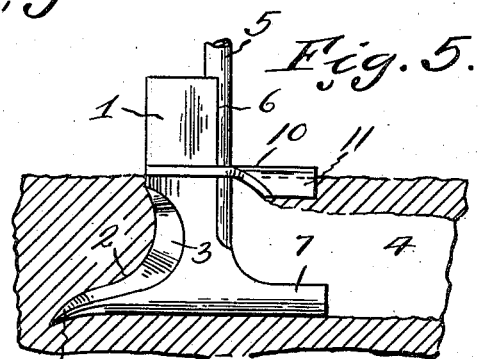
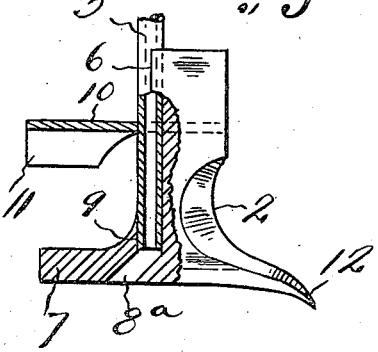
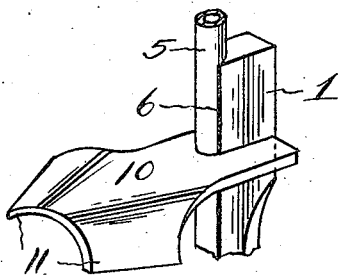
Inventor
Samuel M. McEwen
By Philip A. H. Ferrell
Attorney Patented Apr. 13, 1948

2,439,743

UNITED STATES PATENT OFFICE 2,439,743

SUBSOILER AND AERATOR

Samuel M. McEwen, Baltimore, Md.

Application October 30, 1945, Serial No. 625,569

1 Claim. (Cl. 97—78)

The invention relates to subsoilers and aerators, and has for its object to provide a device of this kind which will easily pass through the ground, forming a channel in the ground, and provided at its forward side with a cutting edge extending from ground level, thence downwardly, inwardly and forwardly, and terminating in a forwardly extending point, and adapted to cut roots, vegetation and the like.

A further object is to form the body of the device of uniform thickness in cross section, and to bevel the device from the cutting edge rearwardly and outwardly so there will be a packing of the earth as it is cut to form a channel in which air may pass for aerating the earth.

A further object is to form the body of the device, including the rearwardly extending portion, through which air or fluid passes, in a single piece, and to weld or otherwise secure to the rear of the body, a downwardly extending tubular member having communication with the rearwardly extending air discharge heel of the device.

A further object is to provide the body of the device with a rearwardly extending channel cover-up and pulverizer and breaking up member, which will cover up the top of the channel in the earth in advance of the air discharge port, thereby trapping the air in the channel and allowing the air to permeate the broken up earth.

A further object is to discharge the air downwardly and rearwardly from the body member so that the expanding air will penetrate the earth through the walls of the channel, and after the covering up operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the device.

Figure 2 is a vertical longitudinal sectional view through the device.

Figure 3 is a perspective view showing the forward cutting edge.

Figure 4 is a vertical transverse sectional view through the channeling element.

Figure 5 is a side elevation of a modified form, showing the means for covering the top of the channel during the aerating operation and breaking the earth.

Figure 6 is a view similar to Figure 5, parts being shown in longitudinal section, and showing a downwardly extending discharge port.

Figure 7 is a detail perspective view of the upper end of the device shown in Figure 5.

The invention is an improvement on my prior Patent No. 1,739,765, issued December 17, 1929, and is adapted to be attached to any kind of agricultural machine, and any number of elements may be used; one being shown for purposes of illustration.

In operation, the device is adapted to be supplied with compressed air, steam or fluid, for instance as shown in my prior patent.

The numeral 1 designates the main body of the channeling element, which is of uniform thickness, and at its forward end, is provided with a downwardly, inwardly and forwardly extending cutting edge 2, formed by relatively wide bevels 3. By providing wide bevels the earth is compacted to the side of the body 1 to form a channel 4 in the earth of the width of the body 1, so air may pass into the channel for aerating the ground. The aeration is accomplished through the supply pipe 5, which pipe is welded or otherwise secured at 6 to the rear side of the body 1, to facilitate manufacture.

The rear of the body 1, at its lower end, is provided with a rearwardly extending heel member 7 having a discharge port 8, which port is in communication with the supply pipe 5, as clearly shown in Figure 1. It will be noted that the lower end of the supply pipe 5 extends into the aperture 9 where the heel member 7 merges into the body 1, hence it is thoroughly braced at all times. The under side of the body and heel member are round in cross section as shown in Figure 4. The air is projected rearwardly and expands within the channel 4 in the earth, and penetrates the walls of the channel, thereby aerating the earth. In some cases it has been found desirable to cover up the channel 4 and break up the earth as shown in Figure 5, and to accomplish this object, and prevent escape of expanding air the body member 1 is provided with a rearwardly extending cover up and earth breaking up member 10, U-shaped in cross section, and having rearwardly converging wings 11, which wings will drag the earth together at opposite sides of the earth slot 4, hence the expanding air will not pass upwardly to the atmosphere through the slot and broken or pulverized earth on opposite sides of the slot.

Referring to Figure 6 wherein a modified form is shown, instead of having a rearwardly extending air discharge port, a downwardly extending port 8a is provided, and a blast of air will break up the earth in a downward direction for insuring a thorough aeration of the earth.

By making the pipe 5 in a separate piece it is obvious an expensive boring operation is obviated, and that the welding operation, in combination with the anchoring at 9, will form a rigid structure which will stand the strain. The forward end of device terminates in a downwardly extending point 12, which will have a tendency, as it passes through the earth, to pull downwardly on the device and maintain the same in the earth.

It will be noted that the members 11 of the member 10 have a plowing action and break up and pulverize the earth as the bit advances, therefore it will be seen that the rearwardly discharged air will not only fill the slot 4, but will thoroughly circulate through the broken up earth, which is broken up a substantial distance on opposite sides of the slot 4.

The invention having been set forth what is claimed as new and useful is:

An agricultural implement for aerating the earth and forming a slot through the earth, said implement comprising a plow body of uniform thickness, the forward end of said plow body terminating in a downwardly, rearwardly and forwardly extending cutting edge, rearwardly extending bevelled sides in the body member and forming said cutting edge, a tubular member through which air is forced, said tubular member being secured to the rear side of the body member in a vertical channel in the rear of the body member, a heel carried by the body member at the rear lower end thereof and having a rearwardly extending discharge port therethrough, the lower end of the tubular member being disposed in an aperture in the body member where the heel merges into the body member and communicating with the rearwardly extending discharge port.

SAMUEL M. McEWEN.

REFERENCES CITED

The following references are of record in the file of this patent:

UNITED STATES PATENTS

| Number | Name | Date |
|---|---|---|
| 69,571 | McSherry | Oct. 8, 1867 |
| 317,802 | Laborde | May 12, 1885 |
| 1,002,344 | Watson | Sept. 5, 1911 |
| 1,739,765 | McEwen | Dec. 17, 1929 |

FOREIGN PATENTS

| Number | Country | Date |
|---|---|---|
| 5,382 | Great Britain | Mar. 15, 1894 |
| 44,688 | Denmark | Sept. 29, 1931 |